Nov. 11, 1969  T. Q. McCRAY  3,478,306
READILY ENGAGEABLE AND READILY RELEASABLE BATTERY TERMINAL AND
BATTERY CABLE CLAMP ASSEMBLY
Filed March 15, 1967
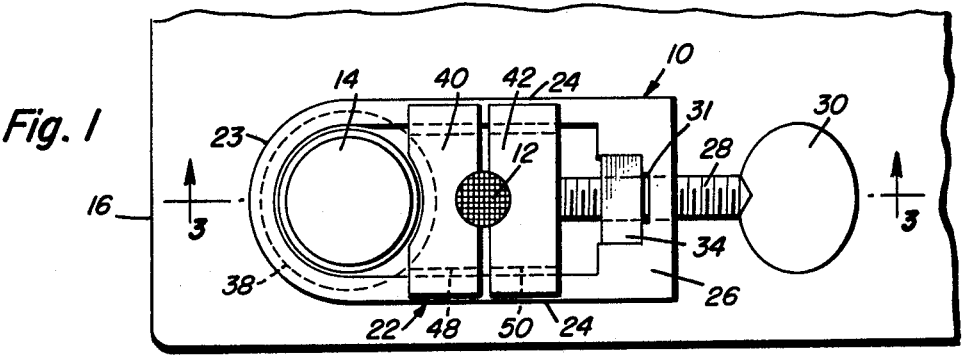
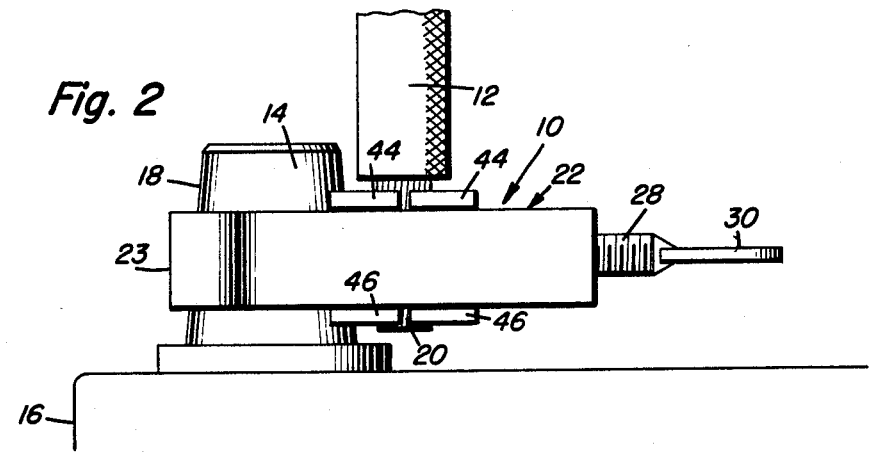
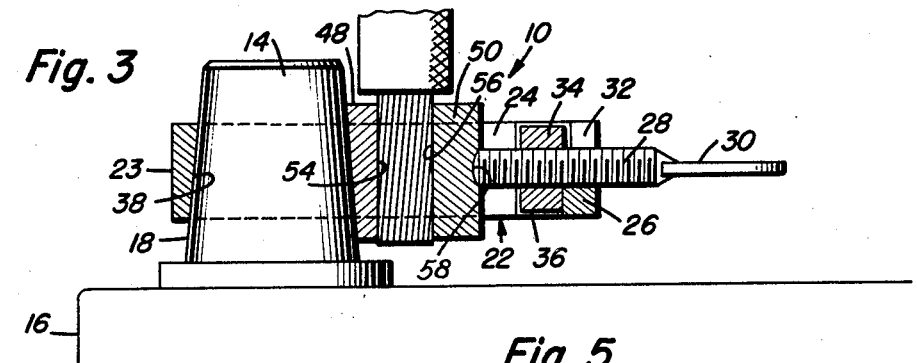
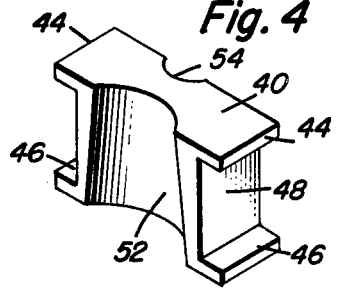
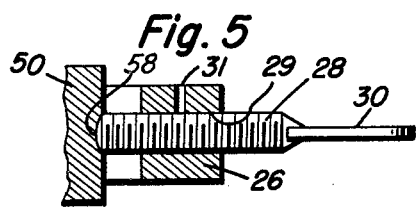
INVENTOR
Thomas Q. McCray
BY Gustave Miller
ATTORNEY

United States Patent Office 3,478,306
Patented Nov. 11, 1969

3,478,306
READILY ENGAGEABLE AND READILY RELEASABLE BATTERY TERMINAL AND BATTERY CABLE CLAMP ASSEMBLY
Thomas Q. McCray, 4575 S. 12th Ave.,
Tucson, Ariz. 85714
Filed Mar. 15, 1967, Ser. No. 623,353
Int. Cl. H01r *11/26*
U.S. Cl. 339—237                              1 Claim

ABSTRACT OF THE DISCLOSURE

This invention is a readily engageable and readily releasable battery terminal and battery cable clamp assembly wherein there are a pair of generally H-shaped clamp members having their H legs sliding on opposite surfaces of a U-shaped body with a closing cross bar at the end opposite the U bight, the U bight being rounded and complementary to a battery terminal, the adjacent face of the near clamp member being similarly complementary to the battery terminal to clamp or release the battery terminal therebetween the other face of this clamp member and the juxtaposed face of the other clamp member being complementary to the end of a battery cable, and the other face of this other clamp member being contacted by the end of a thumb bolt threaded through the cross bar, the threads in the cross bar being either directly in the cross bar or in a nut removably held in a slot intercepting the bolt aperture through the bar, so that, when the bolt is tightened, the clamp members readily slide to clamping position, and when the bolt is released, the clamp members readily slide to releasing position. Thus, the clamp members are not bent or distorted into clamping position and do not need any bending or distortion to release the terminal and cable, as in conventional battery connectors or clamps.

OBJECTS

It is an object of this invention to provide a clamp assembly which clamps or connects a battery cable to a battery terminal with movable sliding clamp members, wherein no parts are bent or distorted in either the clamping or in the releasing action as is conventional in conventional battery clamps or connectors, such bending or distortion tending to damage the terminal or cable.

A further object of this invention is to provide a battery clamping assembly which can be easily manually operated, even without any tools whatsoever, because of the fact that no parts are bent or distorted in connecting or releasing the terminal and cable.

Still a further object of this invention is to provide a battery clamp assembly which is of indefinite life, and which does not damage the battery terminal or cable, and which is provided only with movable clamp members rather than bendable clamp members.

SUMMARY OF INVENTION

This invention is a clamp assembly for clamping or releasing a battery cable to a battery terminal. It includes a U-shape body member having its bight complementary in shape to the frusto-conical surface of the battery terminal, a cross bar integrally attached to the ends of the U-legs, a pair of H clamp members having their H-legs riding or engaging on the top and bottom surfaces of the U-legs between the cross bar and the rounded bight. The juxtaposed faces of the H clamp members have each a semi-cylindrical surface complementary to the cylindrical surface of the battery cable end, for receiving and clamping the cable end therebetween. The surface of the H bar of one clamp is complementary to the surface of the battery terminal to clamp the terminal against the complementary bight, and a manually operable bolt is threaded through the cross bar for forcing the H clamp into clamping position, or for releasing them from such clamping position for disengaging the terminal and cable. The H clamps are of a size to be easily inserted between the U-legs by being first turned, then turned back to operation position with the H-legs riding over and under the U-legs.

BRIEF DESCRIPTION

With the above and related objects in view, this invention consists in the details of construction and combination of parts, as will be more fully understood from the following description, when read in conjunction with the accompanying drawing, in which:

FIG. 1 is a top plan view of the battery clamp of this invention, in operative position.

FIG. 2 is a side elevation view of FIG. 1.

FIG. 3 is a partly sectional view of line 3—3 of FIG. 1.

FIG. 4 is a perspective view of the clamp element between the tapered battery terminal and cylindrical cable terminal.

FIG. 5 is a view similar to FIG. 3, showing a modified form.

DETAILED DESCRIPTION

There is shown at 10 the readily engageable and readily releasable battery terminal and battery cable clamp assembly of this invention. This clamp assembly 10 is used for connecting a battery cable 12 to the battery terminal 14 of an electric battery 16, such as normally used in an automobile or other vehicle. It will be noted that the battery terminal 14 is frusto-conical in shape at 18, as conventional, while the bared end of 20 of the cable 12 is substantially cylindrical likewise as conventional.

The clamp assembly 10 of this invention includes an assembly body 22 of general U-shape, having a rounded bight at 23 connected by U legs 24. The ends of the U legs 24 are connected or closed by a cross bar 26 through which extends threaded thumb bolt 28 provided with a manual readily manipulable handle 30. The threads of bolt 28 may mate with threads 29 in the bolt aperture through the cross bar 26 as in FIG. 5, having an oil access transverse slot 31. To make the threads readily replaceable, if needed, the bolt aperture is shown in FIGS. 1 and 3 in the form of a slot 32, and the mating threads are provided in a nut 34 which readily slides into or out of a complementary slot 36 in closing bar 26. The inner face 38 of bight 23 is complementary frusto-conical to the frusto-conical shape 18 of the battery terminal 14.

In addition, two generally H-shaped clamp members 40 and 42, are provided. Each H-shaped clamp member 42 and 44 has two pair of H legs, the upper H legs 44 riding or sliding on top of the opposite U legs 24 of body 22, and the lower H legs 46 similarly riding on or sliding on the bottom surface of the U legs 24. The length of the H bars 48 and 50 is sufficiently shorter than the distance between the U legs 24 that, when the assembly is being put together or taken apart for any reason, the clamp members 40 and 42 can be rotated 90° and thus be readily inserted or removed between the U legs 24. The face of H bar 48 in clamp member 40 adjacent the frusto-conical surface 38 of bight 23 is likewise frusto-conical at 52, complementary to the frusto-conical shape 18 of battery terminal 14. The other face of H bar 48 in clamp member 46 is provided with a semi-cylindrical recess 54, complementary to the cylindrical surface of the battery cable bared end 20, and a similar semi-cylindrical recess 56 is provided in the juxtaposed face of the H bar 50 of the other clamp member 42. The opposite face of H bar 50 of clamp member 42 may be provided with a dimple 58 complementary to the rounded end of the threaded bolt 28, or, if the threaded bolt has a flat end, either no recess, or a shallow, flat bottom recess may be provided, in which case the end of the bolt will be smooth and may be unthreaded corresponding to the depth of the bolt end received recess.

To assemble the clamping assembly 10, the two clamp members 40 and 42 are inserted, sequentially, with their H bars first at right angles to their assembled position, that is, parallel to the U legs 22, and then rotated to their operative position, bringing the H legs 44 and 46 to their sliding, supporting position above and below the U legs 22. The H legs 44 and 46 fit loosely over and under U legs 22 so that the clamp members 40 and 42 may slide easily along the U legs 22. The bolt 28 with nut 34 threaded thereon is placed in slot 36 in cross bar 26 or through threads 29 in the cross bar. Then the assembly body 22 is placed over the battery terminal 14 with its frusto-conical shape 38 of bight 23 against the battery terminal frusto-conical surface 18, the bared end 20 of cable 12 is inserted between the semi-cylindrical surfaces 54 and 56 of the clamp members 40 and 42, and the thumb bolt handle 30 is manually rotated to tighten the two clamp members 40 and 42 toward the bight 23, thus clamping the terminal 14 and cable 12 mechanically for a good electrical connection. Finger pressure will usually be enough to hold the terminal 14 and cable 12 tightly connected, but if desired, a pair of pliers or Crescent wrench may be used to apply still further tightening pressure. When disengaging the cable 12 from terminal 14, the bolt 28 is rotated in the loosening or opposite direction, and the clamp members 40 and 42 will readily release the terminal 14 and cable 12. Due to the loose fit of the H legs 44 and 46 on the U legs 22, the clamp members 40 and 42 may easily be slid away from engaging position once the bolt 28 has been loosened, there being no friction or bent or distorted parts tending to keep the clamp members in engagement with the terminal 14 and cable 12, and hence there is no need to hammer the clamp member loose, as with conventional battery connectors, often damaging the terminal and thus the battery.

REFERENCE CHECK LIST

In the drawings, like numbers refer to like parts, and for the purposes of explication, set forth below are the numbered parts of the improved readily engageable and readily releasable battery terminal and battery cable clamp assembly.

10 clamp assembly
12 battery cable
14 battery terminal
16 electrical battery
18 frusto-conical shape of terminal 16
20 bared end of cable 12
22 clamp assembly U body
23 rounded bight of U body 22
24 U legs on U body 22
26 closing cross bar of 22
28 threaded thumb bolt
29 threaded aperture in cross bar
30 bolt handle
31 transverse oil slot of 29 in cross bar
32 bolt slot in bar 26
34 nut
36 slot in bar 26 for nut 34
38 frusto-conical shaped inner face of bight 23
40 clamp member adjacent bight 23
42 clamp member adjacent bar 26
44 upper H legs of clamp members 40 and 42
46 lower H legs of clamp members 40 and 42
48 H bar of clamp member 40
50 H bar of clamp member 42
52 frusto-conical recess in one face of H bar 48
54 semi-cylindrical recess in other face of H bar 48
56 semi-cylindrical recess in adjacent face of other H bar 50
58 dimple in other face of H bar 50 to receive end of bolt 28

Although this invention has been described in considerable detail, such description is intended as being illustrative rather than limiting, since the invention may be variously embodied.

Having thus set forth and disclosed the nature of this invention, what is claimed is:

1. A readily engageable and releasable battery terminal and cable clamp assembly (10) comprising a U-shaped body (22) having a rounded bight (23), said rounded bight having a frusto-conical inner face (38) complementary to the surface (18) of a battery terminal (14), said body (22) also having parallel U-legs (24) extending from said rounded bight (23) and having a cross bar (26) integrally connecting the ends of said U-legs (24), a pair of H shape clamp members (40, 42), each clamp member (40, 42) having upper and lower H-legs (44, 46) riding on the upper and lower surfaces of said U-legs (24), the H bar (48, 50) of each clamp member (40, 42) being of a small enough size enabling it to be turned between said U-legs (24) for insertion therebetween and turning to operating position, one H clamp (42) being adjacent said cross bar (26) and the other H clamp (40) being adjacent said bight (23), the faces (54, 56) of the H clamps (40, 42) adjacent to each other being complementary to a battery cable and (20) to be clamped therebetween, the bight facing surface (52) of the clamp (40) adjacent the frusto-conical inner face (38) of the bight (23) being also similarly frusto-conical, for clamping a battery terminal (14) therebetween in parallel relation to the clamped battery cable end (20), and a bolt (28) having a manually operable handle (30) extending through said cross bar (26) and threadedly cooperating therewith, said bolt (28) having one end contacting the cross bar facing surface (58) of said cross bar adjacent clamp (42) whereby when said battery clamp assembly (10) is placed about a battery terminal (14) extending between said bight (23) and the bight adjacent clamp (42) and a battery cable end (20) extending between said clamps (40, 42) parallel to the battery terminal (14), said bolt (28) may be operated against the bar adjacent clamp (42) to secure the cable end (20) and battery terminal (14) in mechanical and electrical connection to each other, and may be operated away from said bar adjacent clamp (42) to release the battery terminal (14) and battery cable end (20) from mechanical and electrical connection to each other, said cross bar (26) having a bolt oil slot (31) therein.

References Cited

UNITED STATES PATENTS

| | | | |
|---|---|---|---|
| 1,529,450 | 3/1925 | Schulte | 339—237 |
| 1,821,486 | 9/1931 | Taylor | 339—237 |
| 2,073,980 | 3/1937 | Williams et al. | 339—237 |
| 2,290,900 | 7/1942 | Thomas | 339—237 X |
| 2,401,130 | 5/1946 | Ayers | 339—272 |
| 2,589,122 | 3/1952 | Olson | 339—237 X |
| 2,634,475 | 4/1953 | Browne | 24—135 |

FOREIGN PATENTS

| | | |
|---|---|---|
| 1,144,931 | 4/1957 | France. |
| 620,281 | 3/1949 | Great Britain. |
| 629,071 | 9/1949 | Great Britain. |
| 238,217 | 11/1945 | Switzerland. |

MARVIN A. CHAMPION, Primary Examiner